(12) United States Patent
Sugitatsu et al.

(10) Patent No.: US 7,198,658 B2
(45) Date of Patent: Apr. 3, 2007

(54) METHOD FOR PRODUCING FEED MATERIAL FOR MOLTEN METAL PRODUCTION AND METHOD FOR PRODUCING MOLTEN METAL

(75) Inventors: Hiroshi Sugitatsu, Kobe (JP); Takao Harada, Kobe (JP); Hidetoshi Tanaka, Kobe (JP); Masaharu Kohno, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 10/677,263

(22) Filed: Oct. 3, 2003

(65) Prior Publication Data

US 2004/0083853 A1    May 6, 2004

(30) Foreign Application Priority Data

Oct. 9, 2002    (JP)    .............................. 2002-296363

(51) Int. Cl.
*C21B 3/02*    (2006.01)
(52) U.S. Cl. .............................. 75/503; 75/414; 75/764
(58) Field of Classification Search ................. 75/414, 75/503, 764
See application file for complete search history.

(56) References Cited

U.S. PATENT DOCUMENTS

| 3,950,267 | A | * | 4/1976 | Arakawa et al. ............. 502/422 |
| 4,569,691 | A | * | 2/1986 | Fichte et al. ................. 420/117 |
| 5,989,019 | A | | 11/1999 | Nishimura et al. |
| 6,063,156 | A | | 5/2000 | Negami et al. |
| 6,129,777 | A | | 10/2000 | Fuji et al. |
| 6,149,709 | A | | 11/2000 | Uragami et al. |
| 6,152,983 | A | | 11/2000 | Kamijo et al. |
| 6,241,803 | B1 | | 6/2001 | Fuji |
| 6,251,161 | B1 | * | 6/2001 | Tateishi et al. ............. 266/177 |

(Continued)

FOREIGN PATENT DOCUMENTS

DE    27 41 216    8/1978

(Continued)

OTHER PUBLICATIONS

U.S. Appl. No. 09/175,481, filed Oct. 20, 1998, Tsuchiya et al.

(Continued)

*Primary Examiner*—Scott Kastler
(74) *Attorney, Agent, or Firm*—Oblon, Spivak, McClelland, Maier & Neustadt, P.C.

(57) ABSTRACT

The prevent invention provides a method for producing a feed material for molten metal production and a method for producing a molten metal capable of sufficiently carbonizing biomass and effectively using carbonized biomass as a reducing agent. In the method for producing a feed material for molten metal production, a mixture containing an iron oxide-containing material and biomass is heated in a heating furnace substantially isolated from oxygen to carbonize the biomass in the mixture and obtain a feed material for molten metal production, or the mixture is charged in a reducing furnace to reduce the iron oxide-containing material after being heated in the heating furnace. In the method for producing a molten metal, the feed material for molten metal production obtained by the method for producing a feed material for molten metal production is charged in a melting furnace to obtain a molten metal.

9 Claims, 2 Drawing Sheets

U.S. PATENT DOCUMENTS

| | | |
|---|---|---|
| 6,254,665 B1 * | 7/2001 | Matsushita et al. ......... 266/177 |
| 6,258,149 B1 | 7/2001 | Sugiyama et al. |
| 6,296,479 B1 | 10/2001 | Nishimura et al. |
| 6,302,938 B1 | 10/2001 | Kamijo et al. |
| 6,319,302 B1 | 11/2001 | Harada |
| 6,334,883 B1 | 1/2002 | Takenaka et al. |
| 6,368,379 B1 | 4/2002 | Tateishi et al. |
| 6,500,381 B1 | 12/2002 | Harada |
| 6,503,289 B2 | 1/2003 | Tanigaki et al. |
| 6,511,316 B2 | 1/2003 | Harada et al. |
| 6,517,770 B1 | 2/2003 | Tateishi et al. |
| 6,521,171 B2 | 2/2003 | Tateishi et al. |
| 6,569,223 B2 | 5/2003 | Tanigaki et al. |
| 6,579,505 B2 | 6/2003 | Tsuchiya et al. |
| 6,585,800 B2 | 7/2003 | Sugitatsu et al. |
| 6,592,647 B2 | 7/2003 | Hino et al. |
| 6,592,649 B2 | 7/2003 | Kikuchi et al. |
| 6,602,320 B2 | 8/2003 | Fuji et al. |
| 6,630,010 B2 | 10/2003 | Ito et al. |
| 6,660,221 B2 | 12/2003 | Urabe et al. |
| 6,669,470 B2 | 12/2003 | Atsushi et al. |
| 6,669,756 B2 | 12/2003 | Urabe et al. |
| 2004/0168550 A1 | 9/2004 | Tsuge et al. |
| 2004/0173054 A1 | 9/2004 | Tsuge et al. |
| 2004/0211295 A1 | 10/2004 | Kikuchi et al. |

FOREIGN PATENT DOCUMENTS

| | | | |
|---|---|---|---|
| DE | 36 42 411 | | 6/1987 |
| DE | 3546261 A | * | 7/1987 |
| EP | 1 264 901 | | 12/2002 |
| JP | 411131072 A | * | 5/1999 |
| JP | 11-241125 | | 9/1999 |
| JP | 2001-55580 | | 2/2001 |
| JP | 2001-65364 | | 3/2001 |
| JP | 2002-509194 | | 3/2002 |

OTHER PUBLICATIONS

U.S. Appl. No. 09/870,797, filed Jan. 6, 2001, Nagata et al.
U.S. Appl. No. 09/965,857, filed Jan. 10, 2001, Tokuda et al.
U.S. Appl. No. 09/988,521, filed Nov. 20, 2001, Harada et al.
U.S. Appl. No. 10/154,962, filed May 28, 2002, Sugitatsu et al.
U.S. Appl. No. 10/161,783, filed Jun. 5, 2002, Shimizu et al.
U.S. Appl. No. 10/166,144, filed Jun. 11, 2002, Fuji et al.
U.S. Appl. No. 10/193,218, filed Jul. 12, 2002, Hashimoto et al.
U.S. Appl. No. 10/223,367, filed Aug. 20, 2002, Tetsumoto et al.
U.S. Appl. No. 10/253,873, filed Sep. 25, 2002, Harada et al.
U.S. Appl. No. 10/265,330, filed Jul. 10, 2002, Tetsumoto et al.
U.S. Appl. No. 10/321,445, filed Dec. 18, 2002, Tsuge et al.
U.S. Appl. No. 60/440,369, filed Jan. 16, 2003, Kikuchi et al.
U.S. Appl. No. 10/395,340, filed Mar. 25, 2003, Maki et al.
U.S. Appl. No. 10/677,263, filed Oct. 3, 2003, Sugitatsu et al.
U.S. Appl. No. 10/480,256, filed Dec. 17, 2003, Ito et al.

* cited by examiner

METHOD FOR PRODUCING FEED MATERIAL FOR MOLTEN METAL PRODUCTION AND METHOD FOR PRODUCING MOLTEN METAL

BACKGROUND OF THE INVENTION

1. Field of the Invention

The present invention relates to a method for producing a feed material for molten metal production, and a method for producing a molten metal. Particularly, the present invention relates to a method for producing reduced iron (molten iron) from an iron oxide-containing material such as an iron ore, steel mill waste, or the like by using biomass as a reducing agent.

2. Description of the Related Art

An example of a technique for utilizing biomass is a technique for generating electric power by gasifying biomass such as organic waste, organic sludge, livestock waste, municipal solid waste, or the like, waste such as waste plastics or the like, or low-quality fossil fuel such as coal, heavy oil, or the like. In this technique, a methane gas obtained from biomass is burned and used as a heat source for generating electric power. However, this technique comprises gasification and combustion steps to complicate the process and increase the cost.

Another example comprises carbonizing biomass to obtain fuel, a water purifying material, or vegetable coal used as a soil conditioner. However, there are only few applications of the resultant carbide.

On the other hand, a process comprising incorporating a carbonaceous material into an iron oxide-containing material such as an iron ore, steel mill waste, or the like, and heating the iron oxide-containing material in a rotary hearth furnace to obtain reduced iron is also known. This process uses coal or coke as the carbonaceous material, and thus the carbonaceous material is expensive.

However, an inexpensive biomass carbide (carbonized biomass) is thought to be used as the carbonaceous material. If the biomass carbide can be used as the carbonaceous material, the utilization of biomass can be further advanced.

In the technical field of reduced iron production, a method using biomass in some form comprises treating composite pellets composed of iron oxide and a solid carbonaceous reducing agent in a reducing furnace to form a directly reduced iron product. In this method, a biomass substance such as wood waste or the like can be used as the solid carbonaceous reducing agent.

However, in this method, in treating the composite pellets composed of biomass and iron oxide in the reducing furnace, air or oxygen is introduced into the reducing furnace, and in this state, the biomass in the composite pellets is thus simply burned fail to secure a sufficient amount of biomass carbide as the reducing agent. For example, the wood waste used as the biomass contains 30 to 50% by mass (% by weight) of organic carbon contents and 3 to 15% by mass of inorganic carbon contents. However, under the above-described condition, the organic carbon contents are mostly burned, and many of the inorganic carbon contents are also burned.

Also, the composite pellets are produced from biomass and iron oxide without a treatment of the biomass. However, this method has a great difficulty in producing the composite pellets, and even when the composite pellets obtained by this method are treated in the reducing furnace in which air or oxygen is not introduced, the resultant biomass carbide does not effectively function as the reducing agent.

Namely, biomass is generally several mm or more in size, for example, wood waste is 10 to 100 mm in length. Therefore, when biomass used as the reducing agent is agglomerated with iron oxide to form the composite pellets, the biomass must be ground before agglomeration, mixed with iron oxide, and then agglomerated. However, wood biomass such as wood waste or the like is fibrous, and it is thus very difficult to pulverize the wood waste to a powder (it is difficult to split a fiber, and thus at least plural types of grinding steps are required). Similarly, construction and demolition waste, thinned wood, and sawmill waste cannot be easily pulverized, and organic waste and municipal solid waste also cannot be easily pulverized. Therefore, it is difficult to pulverize biomass to a powder, and thus it is very difficult to agglomerate biomass with iron oxide.

Even if biomass can be agglomerated with iron oxide without being pulverized, and even if biomass can be treated to produce a biomass carbide in a reducing furnace in which air or oxygen is not introduced, the biomass carbide has little opportunity of contact with iron oxide (small contact surface area) to fail to effectively reduce iron oxide unless the biomass is pulverized to a powder and then agglomerated with iron oxide.

Furthermore, biomass (slurry sludge) with a high water content cannot be easily agglomerated before drying.

On the other hand, as a conceivable measure for avoiding difficulties in agglomeration with iron oxide, biomass is singly carbonized without coexisting with iron oxide. However, biomass such as wood chips or the like generally has a low specific gravity (light) and low thermal conductivity, and thus carbonization of single biomass has low efficiency. In regard to the specific gravity, for example, the bulk specific gravity of wood chips is 0.155 $g/cm^3$ which is considerably lower than the bulk specific gravity of 0.95 $g/cm^3$ of electric furnace dust (an iron-oxide containing material).

In such a process for carbonizing biomass singly, liquid biomass with a high water content also has a problem of unstable treatment because the biomass does not stably stay in a furnace, for example, a rotary kiln, during the treatment. Furthermore, some kind of biomass is easily agglomerated or adhered to the furnace wall to cause a problem about treatment stability and maintenance. Furthermore, the process has a defect that a carbonization gas (reducing gas) produced in carbonization of biomass is not at all utilized for reducing iron oxide.

SUMMARY OF THE INVENTION

The present invention has been achieved in consideration of the above-described situation, and an object of the present invention is to provide a method for producing a feed material for molten metal production capable of sufficiently carbonizing biomass to effectively use the biomass as a reducing agent, and provide a method for producing a molten metal.

In order to achieve the object, a method for producing a feed material for molten metal production and a method for producing a molten metal according to the present invention have the following construction.

In a first aspect of the present invention, a method for producing a feed material for molten metal production comprises heating a mixture containing a metal oxide-containing material and biomass to carbonize the biomass contained in the mixture in a heating furnace which is substantially isolated from oxygen, obtaining a feed material for molten metal production.

In a second aspect of the present invention, a method for producing a feed material for molten metal production comprises heating a mixture containing a metal oxide-containing material and biomass to carbonize the biomass contained in the mixture in a heating furnace which is substantially isolated from oxygen, charging the mixture in a reducing furnace, and then reducing the metal oxide-containing material in the mixture in the reducing furnace to obtain a feed material for molten metal production.

In the method for producing a feed material for molten metal production, the atmospheric temperature in the reducing furnace is preferably 1250 to 1450° C.

The method for producing a feed material for molten metal production may further comprise agglomerating the mixture after carbonizing the biomass in the mixture, and then charging the mixture in the reducing furnace.

The method for producing a feed material for molten metal production may further comprise melting the mixture by heating in the reducing furnace after reducing the metal oxide-containing material contained in the mixture in the reducing furnace.

In the method for producing a feed material for molten metal production, the heating temperature in the heating furnace is preferably 700° C. or more. In the method for producing a feed material for molten metal production, the biomass is preferably wood biomass.

In a third aspect of the present invention, a method for producing a molten metal comprises charging a feed material for molten metal production obtained by the method for producing a feed material for molten metal production in a melting furnace, and then treating the feed material for molten metal production in the melting furnace to obtain a molten metal.

The method for producing a molten metal may further comprise agglomerating the feed material for molten metal production, and then charging the feed material for molten metal production in the melting furnace. In the method for producing a molten metal, the biomass is preferably wood biomass.

DESCRIPTION OF THE PREFERRED EMBODIMENTS

Embodiments of the present invention will be described below. The present invention is not limited to these embodiments.

First Embodiment

Figure 1:
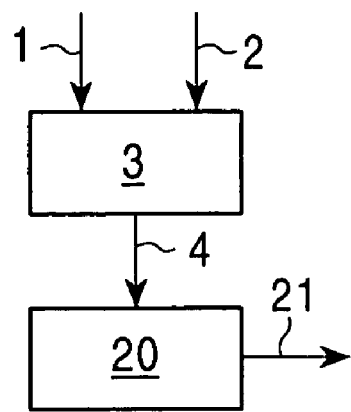
FIG. 1 is a schematic drawing showing the outlines of a method for producing a feed material for molten metal production and a method for producing a molten metal according to a first embodiment of the present invention.

FIG. 1 shows the outlines of a method for producing a feed material for molten metal production and a method for producing a molten metal according to a first embodiment of the present invention.

1. As shown in FIG. 1, biomass 1 and a metal oxide-containing material 2 (for example, an iron oxide-containing material) are charged in a heating furnace (referred to as a "carbonization furnace" hereinafter) 3 which is substantially isolated from oxygen, and a mixture containing the biomass 1 and the metal oxide-containing material 2 is heated to carbonize the biomass 1 in the mixture. As a result, a feed material 4 for molten metal production is produced. The feed material 4 for molten metal production comprises a mixture containing carbonized biomass (biomass carbide) and the metal oxide-containing material (or further containing a reduced metal). This embodiment corresponds to a method for producing a feed material for molten metal production in a first aspect of the present invention.

In this embodiment, when the heating temperature in the heating furnace (carbonization furnace) 3 is set to 700° C. or more, a reductive reaction of the metal oxide-containing material 2 also proceeds.

As the biomass 1, wood biomass such as thinned wood, construction and demolition waste, sawmill waste, or the like is most available. However, other materials such as organic waste, organic sludge, livestock waste, municipal solid waste, and the like can also be used. Furthermore, waste such as waste plastics, low-quality fossil fuel such as heavy oil, coal, and the like may be used.

As the metal oxide-containing material 2, for example, an iron oxide-containing material is used. As the iron oxide-containing material, an iron ore, steel mill waste, an iron oxide-containing residue of non-ferrous refining, and the like can be used.

As the heating furnace (carbonization furnace) 3, an external heating rotary kiln is preferably used. In the rotary kiln, the biomass 1 and the metal oxide-containing material 2 are tumbled to improve heat transfer, and at the same time, to accelerate the reductive reaction. Besides the rotary kiln, a known carbonization furnace such as a repetitive rocking type or fluidized bed type furnace may be used. The heating temperature in the heating furnace (carbonization furnace) 3 is generally about 300 to 1000° C.

2. The feed material 4 for molten metal production produced in the heating furnace (carbonization furnace) 3 is discharged from the heating furnace 3, and then charged in a melting furnace 20 for melting the feed material 4. As a result, a molten metal 21 is produced. In this case, when the metal oxide-containing material 2 is present in the feed material 4 for molten metal production, a metal oxide (for example, iron oxide) contained in the metal oxide-containing material 2 is reduced to form a molten metal (for example, molten iron). Then, the molten metal 21 is discharged from the melting furnace 20. This embodiment corresponds to a method for producing a molten metal in a third aspect of the present invention.

In this case, an electric furnace, a converter, a smelting reduction furnace or reduction and melting furnace can be used as the melting furnace 20. The biomass carbide can be used for reducing the metal oxide remaining unreduced in the heating furnace (carbonization furnace) 3, and also used as a heat source in the melting furnace 20. In the melting furnace 20, only the feed material 4 for molten metal production may be melted, or a combination with another feed material may be melted. The melting furnace 20 is preferably connected directly to the carbonization furnace 3 to effectively utilize the sensible heat of the feed material 4 for molten metal production. However, the melting furnace 20 need not be connected directly to the carbonization furnace 3 so that the feed material 4 for molten metal production discharged from the carbonization furnace 3 is transported to the melting furnace 20 after cooling.

Second Embodiment

Figure 2:
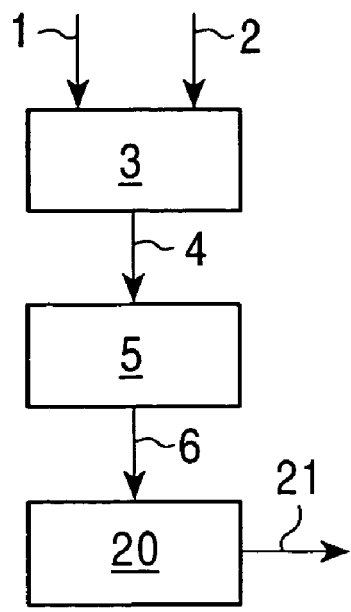
FIG. 2 is a schematic drawing showing the outlines of a method for producing a feed material for molten metal production and a method for producing a molten metal according to a second embodiment of the present invention.

FIG. 2 shows the outlines of a method for producing a feed material for molten metal production and a method for producing a molten metal according to a second embodiment of the present invention.

In the second embodiment, an agglomeration step 5 is added after a feed material 4 for molten metal production is discharged from a heating furnace (carbonization furnace) 3 and before the feed material 4 for molten metal production is charged in a melting furnace 20. Namely, the feed material 4 for molten metal production discharged from the heating furnace 3 and comprising a mixture containing a biomass carbide and a metal oxide-containing material (or further containing a reduced metal) is agglomerated in the agglomeration step 5, and then the agglomerated feed material 6 for molten metal production is charged in the melting furnace 20. This embodiment is different in this point from the first embodiment, and the same as the first embodiment in the other points. This embodiment corresponds to a method for producing a feed material for molten metal production in a second aspect of the present invention, and the method for producing a molten metal in the third aspect of the present invention.

In the second embodiment, an improvement in melting yield in the melting furnace 20 can be expected from the agglomeration. Furthermore, a grinding step may be added before the agglomeration step.

Third Embodiment

Figure 3:
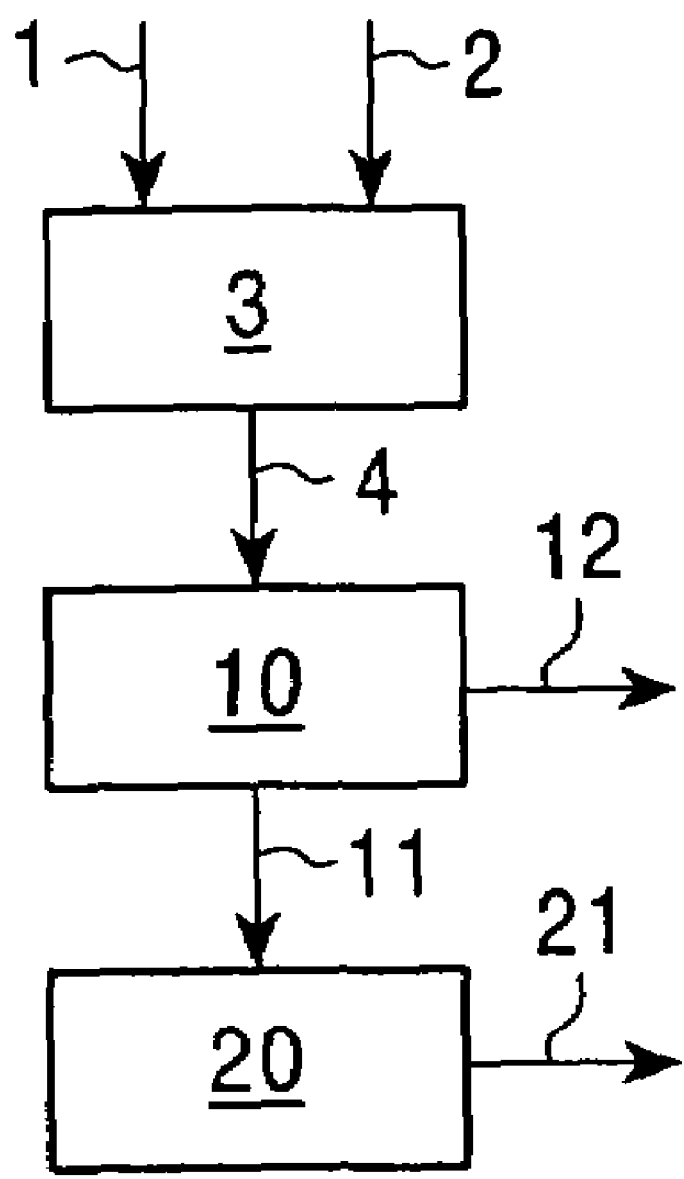
FIG. 3 is a schematic drawing showing the outlines of a method for producing a feed material for molten metal production and a method for producing a molten metal according to a third embodiment of the present invention

FIG. 3 shows the outlines of a method for producing a feed material for molten metal production and a method for producing a molten metal according to a third embodiment of the present invention.

In the third embodiment, a feed material 4 for molten metal production comprising a mixture containing a biomass carbide and a metal oxide-containing material (or further containing a reduced metal) is discharged from a heating furnace (carbonization furnace) 3, and then charged in a reducing furnace 10 for reducing the feed material 4. As a result, a feed material 11 for molten metal production is produced. Then, the feed material 11 for molten metal production discharged from the reducing furnace 10 is charged in a melting furnace 20. The third embodiment is different in this point from the first embodiment, and is the same as the first embodiment in the other points. This embodiment corresponds to the method for producing a feed material for molten metal production in the second aspect of the present invention, and the method for producing a molten metal in the third aspect of the present invention.

When steel mill waste (an iron oxide-containing material) containing a zinc content is used as the metal oxide-containing material 2, zinc oxide remains unreduced in the feed material 4 for molten metal production. This is due to the fact that the heating temperature of the heating furnace (carbonization furnace) 3 is generally 1200° C. or less, and thus reduction of zinc does not take place. When the feed material 4 for molten metal production containing zinc oxide is charged in the melting furnace 20 without any treatment, the zinc content is evaporated in the melting furnace 20 and scattered in an exhaust gas. Therefore, zinc adhesion to a furnace wall and an exhaust gas passage is increased, and the zinc concentration of the dust collected in the exhaust gas passage is increased to concentrate the zinc content in a dust recycle. In order to avoid this problem, the feed material 4 for molten metal production is preferably dezincified in the reducing furnace before being charged in the melting furnace 20.

Particularly, the third embodiment is suitable for a case in which a material containing a zinc content is used as the metal oxide-containing material 2. Namely, dezincification can be performed in the reducing furnace 10 to prevent the evaporation of the zinc content in the melting furnace 20, zinc scattering in the exhaust gas, and concentration of zinc. In this case, the zinc content can be recovered as crude zinc oxide 12 from the reducing furnace exhaust gas. When the metal oxide is sufficiently reduced in the heating furnace (carbonization furnace) 3, reduction, evaporation, and removal of zinc oxide are mainly performed in the reducing furnace 10.

In the use of a rotary hearth furnace as the reducing furnace 10, the feed material 4 for molten metal production comprising a mixture containing a biomass carbide and a metal oxide-containing material (or further containing a reduced metal)] is more uniformly heated in the rotary hearth furnace, as compared with the heating furnace (carbonization furnace) 3. Therefore, a high rate of metallization can be achieved, thereby desirably decreasing a reductive load on the melting furnace 20.

Although, in the third embodiment, the carbonization furnace 3 and the reducing furnace 10 are independent, a multiple-hearth furnace or same furnace having the functions as both the carbonization furnace 3 and the reducing furnace 10 may be used.

The present invention is carried out in any one of the above-described embodiments. The operation of the present invention will be mainly described below.

As described above, the method for producing the feed material for molten metal production of the present invention comprises heating a mixture containing a metal oxide-containing material and biomass to carbonize the biomass contained in the mixture in a heating furnace which is substantially isolated from oxygen, obtaining the feed material for molten metal production.

In this way, the mixture containing the metal oxide-containing material and the biomass is heated to carbonize the biomass contained in the mixture in the heating furnace substantially isolated from oxygen, thereby sufficiently carbonizing the biomass. Also, reduction with the carbonized biomass (biomass carbide) takes place according to the heating conditions, and thus the metal oxide contained in the metal oxide-containing material is partially or entirely reduced to a reduced metal.

As a result, a feed material for molten metal production comprising a mixture containing the biomass carbide (carbonized biomass) and the metal oxide-containing material (and/or the reduced metal) can be obtained.

When the feed material for molten metal production is charged in the melting furnace for melting, the biomass carbide contained in the feed material for molten metal production functions as a reducing agent for reducing the metal oxide contained in the metal oxide-containing material of the feed material for molten metal production.

Therefore, the method for producing the feed material for molten metal production of the present invention is capable of sufficiently carbonizing the biomass to obtain the feed material for molten metal production containing the carbonized biomass (biomass carbide) which can be effectively used as the reducing agent.

The method for producing the molten metal of the present invention comprises charging the feed material for molten metal production obtained as described above in the melting furnace for melting to obtain a molten metal.

Therefore, the method for producing the molten metal of the present invention is capable of sufficiently carbonizing the biomass, and effectively utilizing the carbonized biomass (biomass carbide) as the reducing agent.

The method for producing the feed material for molten metal production and the method for producing the molten metal of the present invention exhibit not only the above-described operations but also the operations below.

Since the metal oxide-containing material and the biomass are simultaneously charged in the heating furnace (carbonization furnace), a treatment can be performed without agglomeration, and thus a pre-treatment such as grinding, agglomeration, or the like is unnecessary. Also, the metal oxide-containing material functions as a heating medium to effectively heat the biomass.

Furthermore, the metal oxide-containing material enters into gaps between wood chips used as the biomass to cause little scattering of the metal oxide-containing material powder and to increase the opportunity of contact between the generated carbonization gas (reducing gas) and the metal oxide-containing material, thereby promoting a reductive reaction of the metal oxide. Particularly, when the heating temperature of the heating furnace is 700° C. or more, a reductive reaction of the metal oxide is promoted.

Liquid biomass can be charged in the heating furnace without any treatment, and thus a pre-treatment such as drying or the like is unnecessary. Also, the metal oxide-containing material functions as a heating medium to effectively heat the biomass, and mixing with the metal oxide-containing material can suppress an outflow of the liquid biomass to attain a stable retention time.

Furthermore, the metal oxide-containing material can be expected to exhibit an effect of removing tar or the like contained in the biomass adhering to the furnace wall of the heating furnace.

The mixture containing the biomass carbide having a low specific gravity (light) and the metal oxide-containing material (metal-containing material) having a high specific gravity (heavy) has a high specific gravity before being charged in the melting furnace, thereby suppressing scattering of the biomass carbide not dissolved in a melt in the melting furnace.

After heating in the heating furnace, the mixture may be charged in the reducing furnace for reducing the metal oxide-containing material contained in the mixture in the reducing furnace, so that the resultant mixture can be charged as the feed material for molten metal production in the melting furnace for melting. In this case, even when the metal oxide-containing material contains a zinc content, dezincification can be performed in the reducing furnace to cause the advantage of preventing the evaporation of the zinc content in the melting furnace, zinc scattering in the exhaust gas, and concentration of zinc. The zinc content can be recovered as crude zinc oxide from the reducing furnace exhaust gas.

The atmospheric temperature in the reducing furnace is not limited, and the temperature is, for example, 1250° C. to 1450° C. With the atmospheric temperature of 1250° C. to 1450° C., a reductive reaction of the metal oxide is promoted, and damage to a refractory of the reducing furnace can be desirably suppressed.

After the metal oxide-containing material of the mixture is reduced in the reducing furnace, the mixture is then melted by heating in the reducing furnace. As a result, reduction proceeds, and the reduced metal oxide (reduced metal) is carburized with a carbon component to decrease the melting point of the reduced metal, thereby permitting melting of the reduced metal. In this case, melting in the reducing furnace (functioning as both the reducing furnace and the melting furnace) can effectively produce the reduced metal from which slag is separated.

After the biomass contained in the mixture is carbonized, the resultant mixture may be agglomerated and then charged in the reducing furnace. In this case, handling in the reducing furnace is facilitated, and heat transfer in the mixture is improved to increase the reduction efficiency. Also, the amount of the dust scattered from the reducing furnace can be decreased.

When the heating temperature in the heating furnace is 700° C. or more, a reductive reaction of the metal oxide also proceeds in the heating furnace to further improve the efficiency of utilization of the biomass as the reducing agent.

In the method for producing the molten metal of the present invention, the feed material for molten metal production may be agglomerated and then charged in the melting furnace. When the feed material for molten metal production is agglomerated and then charged in the melting furnace, melting yield is improved by agglomeration.

Each of the heating furnace (carbonization furnace), the reducing furnace and the melting furnace generates a reducing gas. However, the reducing gas can be used as fuel (for example, fuel for a burner) of each furnace. In each of the heating furnace and the reducing furnace, the reducing gas can be used as a gas for controlling the atmosphere in the furnace or a gas for preventing reoxidation near an exhaust portion.

In the present invention, the biomass is generally charged in the form of chips or slurry in the heating furnace without agglomeration.

In the present invention, examples of the biomass include wood biomass such as general wood waste and the like, organic waste, organic sludge, livestock waste, industrial waste, municipal solid waste, waste plastics, and the like, which can be carbonized by heating.

Particularly, wood biomass such as wood waste and the like, waste plastics and the like are actually used from the viewpoint of properties and quantitative securement.

With regard to the heating furnace which is substantially isolated from oxygen, a heating operation cannot be actually performed in a completely closed furnace. Therefore, the heating furnace does not mean a completely closed heating furnace, but means a heating furnace into which oxygen or air is not positively blown, and the heating furnace is not limited to a heating furnace completely isolated from air.

The term "agglomeration" means the formation of a block such as a pellet, a briquette, a lump, a plate, a rod, or the like.

The metal oxide-containing material means a material containing a metal oxide. The metal oxide-containing material includes a material containing only a metal oxide, and a material containing a metal oxide and other components (a metal and the like). Examples of the metal oxide include iron oxide, nickel oxide, chromium oxide, manganese oxide, and the like. The metal oxide contained in the metal oxide-containing material is not limited to one type, and two or more types of metal oxides may be contained. The metal oxide-containing material containing iron oxide as the metal oxide is referred to as an "iron oxide-containing material". As the iron oxide-containing material, an iron ore, steel mill waste, an iron oxide-containing residue in non-ferrous refining, or the like may be used.

EXAMPLES

Examples and comparative examples of the present invention will be described below. The present invention is not limited to these examples.

Examples 1 to 5 and Comparative Example 1

(1) Electric arc furnace dust (an iron oxide-containing material) having the composition shown in Table 1 was used as the metal oxide-containing material. Wood biomass such as waste wood chips was used as biomass. The waste wood chips contained many chips having a length of about 10 to 100 mm, and a width of about 1 to 20 mm. In Table 1. T.Fe(%) represents a total iron amount (%), i.e., a total amount (%) of Fe and Fe contained in a Fe-containing material such as iron oxide or the like, and M.Fe represents metallic iron, i.e., Fe (metallic iron) (this applies to the description below).

The metal oxide-containing material (electric arc furnace dust) and the biomass (waste wood chips) were charged in an external heating rotary kiln carbonization furnace (a heating furnace) for heating a mixture containing both materials in the carbonization furnace to carbonize the waste wood chips or further reduce the metal oxide-containing material. In this step, the quantitative ratio of the electric furnace dust to the waste wood chips was 40 parts by mass of the electric furnace dust relative to 60 parts by mass of the waste wood chips. The heating temperature and heating time in the carbonization furnace were changed as parameters.

After heating, the composition of the mixture (the feed material for molten metal production of each of Examples 1 to 5) discharged from the carbonization furnace was analyzed. Table 2 shows the composition of the feed material for molten metal production of each of Examples 1 to 5.

(2) On the other hand, 60 parts by mass of the same waste wood chips as described above were carbonized by heating in an external heating rotary kiln carbonization furnace to produce a carbide. Then, the carbide was mixed with 40 parts by mass of electric furnace dust to form a mixture (a feed material for molten metal production of Comparative Example 1). In the external heating rotary kiln carbonization furnace, the heating temperature was 800° C., and the heating time was 1 hour. As a result, 11.4 parts by mass of carbide was obtained from 60 parts by mass of the waste wood chips. The carbon content of the carbide was 68.35% by mass.

Table 3 shows the composition of the feed material for molten metal production of Comparative Example 1.

(3) In any one of the examples, the carbon content was derived from the biomass (waste wood chips), and the iron content and zinc content were derived from the metal oxide-containing material (electric arc furnace dust). Table 4 shows a comparison between the number of moles of residual carbon per 100 g of T.Fe (total iron) and the number of moles of oxygen (oxygen bound to iron and zinc) to be removed per 100 g of T.Fe in each of Examples 1 to 5 and Comparative Example 1.

Table 4 indicates that in the examples (Examples 1 to 5), the amount of residual carbon is larger than the amount of oxygen to be removed, while in Comparative Example 1, the amount of residual carbon is smaller than the amount of oxygen to be removed.

In the step of melting and reducing the feed material for molten metal production, about 1 mol of carbon is required for removing 1 mol (mole) of oxygen. In the feed material for molten metal production of each of the examples (Examples 1 to 5), the ratio of carbon amount (mol)/oxygen amount (mol) exceeds 1, while in the feed material for molten metal production of Comparative Example 1, the ratio of carbon amount (mol)/oxygen amount (mol) is less than 1. It is thus found that in the feed material for molten metal production of each of the examples (Examples 1 to 5), carbon required for reduction remains, while in the feed material for molten metal production of Comparative Example 1, carbon required for reduction is insufficient. This is possibly because that in each of the examples, the metal oxide-containing material and the biomass are coexisted in the rotary kiln carbonization furnace to improve the efficiency of carbonization, and a reductive reaction of the metal oxide with the carbonization gas (reducing gas) generated in carbonization takes place.

Therefore, in the step of melting the feed material for molten metal production charged in the melting furnace and reducing the metal oxide (iron oxide) contained in the metal oxide-containing material (iron oxide-containing material) in the feed material for molten metal production, carbon required for reduction remains in the feed material for molten metal production of each of the examples (Examples 1 to 5), thereby permitting sufficient reduction of the metal oxide (ion oxide). On the other hand, carbon required for reduction is insufficient in the feed material for molten metal production of Comparative Example 1, thereby failing to sufficiently reduce the metal oxide (iron oxide).

Examples 6 and 1A

The same metal oxide-containing material (electric arc furnace dust as an iron oxide-containing material) and biomass (waste wood chips) as those used in Examples 1 to 5 were charged in the same external heating rotary kiln carbonization furnace as in Examples 1 to 5, for heating in the carbonization furnace. The heating temperature was 800° C., and the heating time was 1 hour. In Example 1A, the ratio of the electric furnace dust to the waste wood chips was 60 parts by mass of the electric furnace dust relative to 40 parts by mass of the biomass, while in Examples 6, the ratio of the electric furnace dust to the waste wood chips was 40 parts by mass of the electric furnace dust relative to 60 parts by mass of the biomass.

Table 5 shows the composition of the material (the feed material for molten metal production of each of Examples 6 and 1A) discharged from the carbonization furnace after heating.

Table 5 indicates that in Example 1A, the rate of metallization of the metal oxide (iron oxide) is 69%, while in Example 6, the rate of metallization is 82%. In this way, the rate of metallization of the metal oxide in Example 6 is higher than that in Example 1A. This is due to the fact that in Example 6, the quantitative ratio of the biomass to the electric furnace dust is higher than that in Examples 1A. The rate of metallization of the metal oxide is a value determined by the following equation.

Metallization degree of metal oxide (%)=(M.Fe/T.Fe)×100.

The carbon content (residual carbon content) in the feed material for molten metal production discharged from the carbonization furnace can be used as the reducing agent for reducing the metal oxide in the step of melting the feed material for molten metal production in the melting furnace, and can be further used as a heating source. As shown in Table 5, the residual carbon content in Example 6 is significantly larger than that in Example 1A. This is due to the fact that in Examples 6, the quantitative ratio of the biomass to the electric furnace dust is higher than that in Example 1A.

It is also found that zinc remains in the feed material for molten metal production discharged from the carbonization furnace, and thus the reductive evaporation of zinc does not proceed at the heating temperature of 800° C. in the carbonization furnace.

In order to increase the rate of removal of the zinc content and the rate of metallization of the metal oxide (iron oxide), the feed material for molten metal production discharged from the carbonization furnace is preferably melted in the melting furnace after treatment in the reducing furnace such as a rotary hearth furnace or the like.

TABLE 1

| % by weight | | | | |
|---|---|---|---|---|
| T.Fe | FeO | M.Fe | C | Zn |
| 31.03 | 1.13 | 0.81 | 0.32 | 31.98 |

TABLE 2

| | Heating temperature | Heating time | % by mass | | | | |
|---|---|---|---|---|---|---|---|
| | | | T.Fe | FeO | M.Fe | C | Zn |
| Example 1 | 800° C. | 1 hr | 23.79 | 3.33 | 19.56 | 19.80 | 19.97 |
| Example 2 | 600° C. | 1 hr | 25.36 | 10.47 | 0.76 | 13.46 | 20.45 |
| Example 3 | 400° C. | 1 hr | 23.31 | 3.55 | 0.74 | 15.79 | 20.08 |
| Example 4 | 600° C. | 0.5 hr | 25.47 | 9.02 | 0.42 | 12.12 | 21.31 |
| Example 5 | 800° C. | 0.5 hr | 28.53 | 11.83 | 16.29 | 9.04 | 25.12 |

TABLE 3

| | % by mass | | | | |
|---|---|---|---|---|---|
| | T.Fe | FeO | M.Fe | C | Zn |
| Comparative Example 1 | 26.1 | 1.0 | 0.7 | 11.2 | 26.7 |

TABLE 4

| | Oxygen amount (mol/100 g-Fe) | Carbon amount (mol/100 g-Fe) | Carbon amount/ oxygen amount (mol/mol) |
|---|---|---|---|
| Example 1 | 1.66 | 6.94 | 4.2 |
| Example 2 | 3.55 | 4.42 | 1.2 |
| Example 3 | 3.81 | 5.64 | 1.5 |
| Example 4 | 3.67 | 3.97 | 1.1 |
| Example 5 | 2.21 | 2.64 | 1.2 |
| Comparative Example 1 | 4.15 | 3.58 | 0.9 |

TABLE 5

| | % by mass | | | | |
|---|---|---|---|---|---|
| | T.Fe | FeO | M.Fe | C | Zn |
| Example 1A | 28.73 | 9.42 | 19.79 | 8.89 | 24.34 |
| Example 6 | 23.79 | 3.33 | 19.56 | 19.80 | 19.97 |

The method for producing the feed material for molten metal production of the present invention is capable of sufficiently carbonizing biomass, and producing a feed material for molten metal production comprising carbonized biomass (biomass carbide) which can be effectively used as a reducing agent.

The method for producing the molten metal of the present invention is capable of sufficiently carbonizing biomass and effectively utilizing carbonized biomass (biomass carbide) as a reducing agent.

What is claimed is:

1. A method for producing a feed material for molten metal production, the method comprising the steps of:
   heating a mixture containing a metal oxide-containing material and biomass to carbonize the biomass in the mixture in a heating furnace, where the heating furnace is substantially isolated from oxygen;
   then agglomerating the mixture;
   then charging the mixture in a reducing furnace;
   reducing the metal oxide-containing material contained in the mixture in the reducing furnace; and
   obtaining the feed material, where the feed material comprises a mixture containing a carbide of the biomass and the metal oxide-containing material, and the metal oxide-containing material comprises metal oxide, partially or entirely reduced to a reduced metal.

2. The method for producing a feed material for molten metal production according to claim 1, wherein the atmospheric temperature in the reducing furnace is 1250° C. to 1450°C.

3. The method for producing a feed material for molten metal production according to claim 1, further comprising a step of melting the mixture in the reducing furnace by heating in the reducing furnace after the step of reducing the metal oxide-containing material contained in the mixture in the reducing furnace.

4. The method for producing a feed material for molten metal production according to claim 1, wherein the heating temperature in the heating furnace is 700° C. or more.

5. A method for producing a molten metal, comprising the steps of:
   charging a feed material for molten metal production obtained by the method according to claim 1 in a melting furnace; and
   melting the feed material in the melting furnace.

6. The method for producing a molten metal according to claim 5, further comprising a step of agglomerating the feed material for molten metal production before the step of charging the feed material in the melting furnace.

7. The method for producing a feed material for molten metal production according to claim 1, wherein the biomass is wood biomass.

8. The method for producing a feed material for molten metal production according to claim 1, wherein the metal oxide-containing material is an iron oxide-containing material.

9. The method for producing a feed material for molten metal production according to claim 1, wherein the reducing furnace is a rotary heath furnace.

* * * * *

UNITED STATES PATENT AND TRADEMARK OFFICE
CERTIFICATE OF CORRECTION

PATENT NO. : 7,198,658 B2 Page 1 of 1
APPLICATION NO. : 10/677263
DATED : April 3, 2007
INVENTOR(S) : Sugitatsu et al.

It is certified that error appears in the above-identified patent and that said Letters Patent is hereby corrected as shown below:

On the title page, Item (73), the Assignee Information is incorrect. Item (73) should read:

-- (73) Assignee: Kabushiki Kaisha Kobe Seiko Sho (Kobe Steel, Ltd.) Kobe-shi (JP)--

Signed and Sealed this

Twenty-sixth Day of June, 2007

JON W. DUDAS
*Director of the United States Patent and Trademark Office*